United States Patent
Wakabayashi et al.

(10) Patent No.: US 11,985,587 B2
(45) Date of Patent: May 14, 2024

(54) COMMUNICATIONS DEVICES, INFRASTRUCTURE EQUIPMENT, LOCATION SERVERS AND METHODS

(71) Applicants: Sony Corporation, Tokyo (JP); Sony Mobile Communications Inc., Tokyo (JP)

(72) Inventors: Hideji Wakabayashi, Basingstoke (GB); Anders Berggren, Basingstoke (GB); Yuxin Wei, Basingstoke (GB); Vivek Sharma, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/954,530

(22) PCT Filed: Dec. 14, 2018

(86) PCT No.: PCT/EP2018/085048
§ 371 (c)(1),
(2) Date: Jun. 17, 2020

(87) PCT Pub. No.: WO2019/121420
PCT Pub. Date: Jun. 27, 2019

(65) Prior Publication Data
US 2021/0084577 A1   Mar. 18, 2021

(30) Foreign Application Priority Data
Dec. 18, 2017   (EP) .................................... 17208146

(51) Int. Cl.
*H04W 48/16*   (2009.01)
*H04W 4/021*   (2018.01)
(Continued)

(52) U.S. Cl.
CPC .......... *H04W 48/16* (2013.01); *H04W 4/021* (2013.01); *H04W 4/024* (2018.02); *H04W 48/18* (2013.01); *H04W 76/16* (2018.02)

(58) Field of Classification Search
None
See application file for complete search history.

(56) References Cited

U.S. PATENT DOCUMENTS

| 10,321,456 B2 | 6/2019 | Koulakiotis et al. |
| 2010/0093340 A1* | 4/2010 | Buracchini ........... H04W 76/14 455/426.1 |

(Continued)

FOREIGN PATENT DOCUMENTS

| EP | 1532833 A2 | 5/2005 |
| WO | 2014/052339 A1 | 4/2014 |

(Continued)

OTHER PUBLICATIONS

International Search Report and Written Opinion dated Mar. 6, 2019 for PCT/EP2018/085048 filed on Dec. 14, 2018, 18 pages.

(Continued)

*Primary Examiner* — German Viana Di Prisco
(74) *Attorney, Agent, or Firm* — XSENSUS LLP

(57) ABSTRACT

A communications device for use in a wireless communications system comprising an infrastructure equipment, a location server, a contents server and the communications device is provided. The communications device comprises transceiver circuitry and controller circuitry. The transceiver circuitry and controller circuitry are configured in combination to receive assistance information comprising a communication trigger from the location server via the infrastructure equipment, to estimate a current geographical location of the communications device, and to select, dependent on the current geographical location of the communications device and/or on the communication trigger, one of (Continued)

a plurality of wireless communications technologies to be used by the communications device for communication.

18 Claims, 7 Drawing Sheets

(51) Int. Cl.
  *H04W 4/024* (2018.01)
  *H04W 48/18* (2009.01)
  *H04W 76/16* (2018.01)

(56) References Cited

U.S. PATENT DOCUMENTS

| | | | |
|---|---|---|---|
| 2010/0296448 A1* | 11/2010 | Vainikka | H04W 92/20 370/328 |
| 2011/0306364 A1* | 12/2011 | Gossain | H04L 12/5692 455/456.6 |
| 2012/0120816 A1 | 5/2012 | Garg | |
| 2015/0208197 A1* | 7/2015 | Keskitalo | H04W 24/10 455/456.1 |
| 2015/0312808 A1* | 10/2015 | Kiss | H04W 48/14 370/331 |
| 2015/0351013 A1 | 12/2015 | Zhang et al. | |
| 2016/0037439 A1 | 2/2016 | Shamis | |
| 2016/0044591 A1* | 2/2016 | Pao | H04W 12/06 370/329 |
| 2016/0286361 A1* | 9/2016 | Ciecko | H04W 4/029 |
| 2017/0347235 A1* | 11/2017 | Jeong | H04W 4/023 |
| 2018/0124643 A1* | 5/2018 | Gupta | H04W 48/16 |
| 2020/0015150 A1* | 1/2020 | Shamis | H04W 40/244 |

FOREIGN PATENT DOCUMENTS

| | | |
|---|---|---|
| WO | 2016/130353 A2 | 8/2016 |
| WO | 2019/121419 A1 | 6/2019 |

OTHER PUBLICATIONS

Thorpe, M. and Zelmer, E., "LTE Location Based Services Technology Introduction," White paper, Rohde & Schwarz LTE Location Based Services, Sep. 2013, 23 pages.

3GPP, "Universal Mobile Telecommunications System (UMTS); LTE; Architecture enhancements for non-3GPP accesses", ETSI 3rd Generation Partnership Project, TS 23.402 version 10.4.0, Release 10, Jun. 2011, pp. 1-232.

3GPP, "Technical Specification Group Core Network and Terminals; Access Network Discovery and Selection Function (ANDSF) Management Object (MO)", ETSI 3rd Generation Partnership Project, TS 24.312 version 13.4.0, Release 13, Sep. 2016, pp. 1-391.

3GPP, "Universal Mobile Telecommunications System (UMTS); Radio Resource Control (RRC); Protocol specification", ETSI 3rd Generation Partnership Project, TS 25.331 version 12.3.0, Release 12, Oct. 2014, pp. 1-2222.

3GPP, "LTE; Evolved Universal Terrestrial Radio Access (E-UTRA); Radio Resource Control (RRC); Protocol specification", ETSI 3rd Generation Partnership Project, TS 36.331 version 15.3.0, Release 15, Oct. 2018, pp. 1-915.

3GPP, "Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2", ETSI 3rd Generation Partnership Project, TS 37.320 version 13.1.0, Release 13, Apr. 2016, pp. 1-27.

5G, "The Mobile Broadband Standard," 3GPP Specification Series, 36, 7 pages, [Retrieved on May 21, 2020] Retrieved from the Internet:<https://www.3GPP.org/DynaReport/36-series.htm>.

5G, "The Mobile Broadband Standard," 3GPP Specification Series, 38, 3 pages, [Retrieved on May 21, 2020] Retrieved from the Internet: <https://www.3GPP.org/DynaReport/38-series.htm>.

* cited by examiner

COMMUNICATIONS DEVICES, INFRASTRUCTURE EQUIPMENT, LOCATION SERVERS AND METHODS

CROSS-REFERENCE TO RELATED APPLICATIONS

The present application is based on PCT filing PCT/EP2018/085048, filed Dec. 14, 2018, which claims priority to EP 17208146.5, filed Dec. 18, 2017, the entire contents of each are incorporated herein by reference.

BACKGROUND

Field of Disclosure

The present disclosure relates to communications devices, infrastructure equipment and location servers of wireless communications systems.

Description of Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP (3rd Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things" (IoT), and may typically be associated with the transmissions of relatively small amounts of data with relatively high latency tolerance. Low complexity devices are also often low power devices, in which it is desirable for such devices to have a low power consumption (and therefore a long battery life).

Future wireless communications networks will be expected to routinely and efficiently support location based services with a wider range of devices/applications than current systems are optimised to support. For example, it is expected that wireless communications in 5G will support geo-fencing services such as child location services, mobile coupons/advertisements which are triggered near a shop and airport automatic check-in at the gate/counter. These applications require continuous tracking of UE position or monitoring the equivalent trigger conditions with low UE power consumption.

In view of this there is expected to be a desire for future wireless communications networks, for example those which may be referred to as 5G ($5^{th}$ Generation) or new radio (NR) system/new radio access technology (RAT) systems, as well as future iterations/releases of existing systems, to efficiently support connectivity for a wide range of devices. In particular, the problem of how to efficiently transmit signals to and receive signals from low complexity devices whilst keeping the power consumption of such devices low needs to be addressed.

SUMMARY OF THE DISCLOSURE

The present disclosure can help address or mitigate at least some of the issues discussed above.

Embodiments of the present technique can provide a communications device for use in a wireless communications system comprising an infrastructure equipment, a location server and the communications device. The communications device comprises transceiver circuitry and controller circuitry. The transceiver circuitry and controller circuitry are configured in combination to receive assistance information comprising a communication trigger from the location server via the infrastructure equipment, to estimate a current geographical location of the communications device, and to select, dependent on the current geographical location of the communications device and/or on the communication trigger, one of a plurality of wireless communications technologies to be used by the communications device.

Embodiments of the present technique, which further relate to infrastructure equipment, location servers methods of operating communications devices, infrastructure equipment and location servers and circuitry for communications devices, infrastructure equipment and location servers, allow for users of communications devices to retrieve relevant information or services when indoors, such as by a target item in a shop, even when indoor cellular coverage on the spot is poor.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
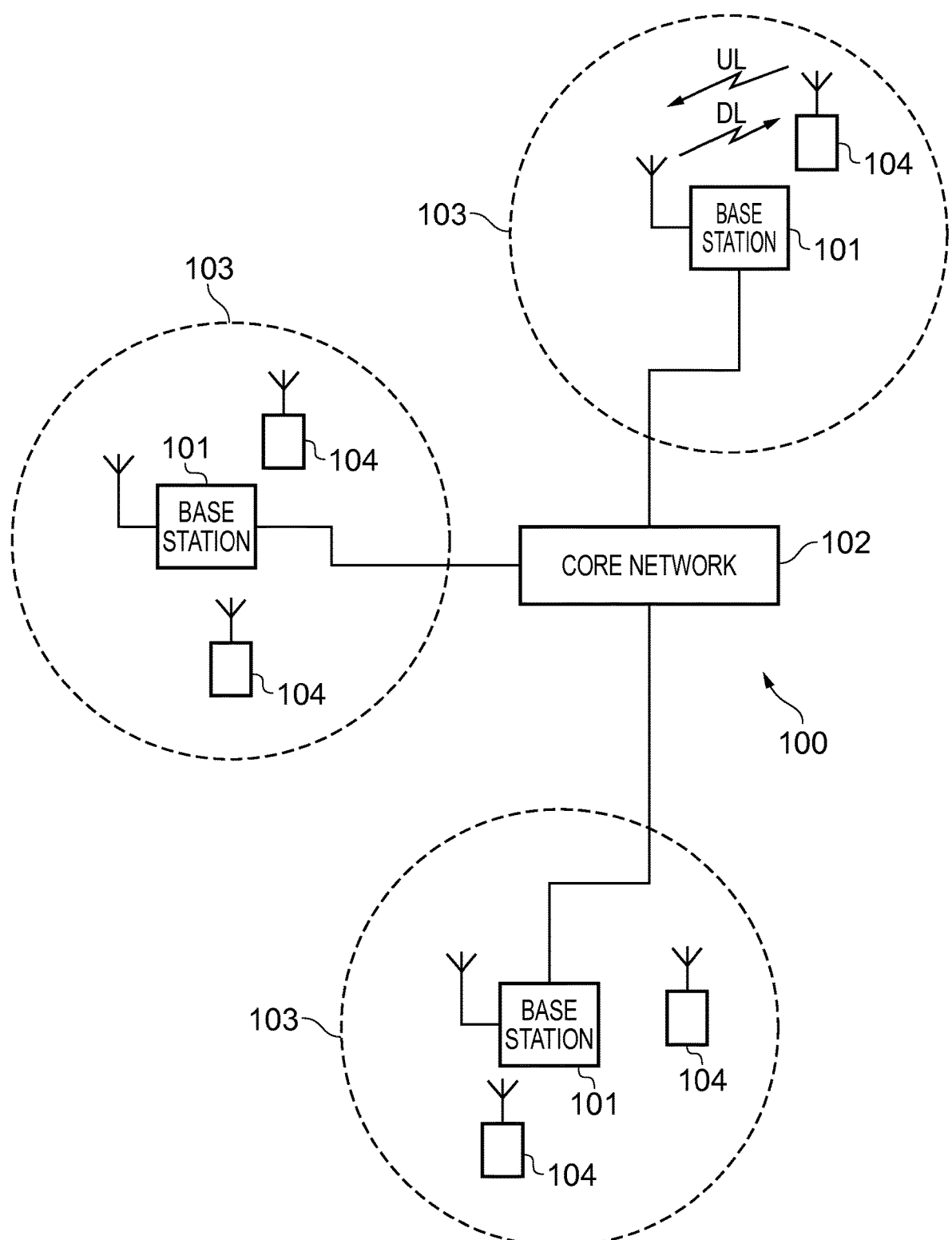
FIG. 1 schematically represents some aspects of a wireless telecommunication system which may be configured to operate in accordance with certain embodiments of the present disclosure.

FIG. 1 provides a schematic diagram illustrating some basic functionality of a mobile telecommunications network/system 100 that may operate generally in accordance with LTE principles and/or other radio access technologies, and which may be adapted to implement embodiments of the disclosure as described herein. Various elements of FIG. 1 and certain aspects of their respective modes of operation are well-known and defined in the relevant standards administered by the 3GPP® body, such as the 3GPP TS36 series primarily relating to LTE [1] and the 3GPP TS38 series primarily relating to NR [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102 and a location service server 306 (discussed further below). Each base station provides a coverage area 103 (i.e. a cell) within which data can be communicated to and from terminal devices 104. Data is transmitted from base stations 101 to terminal devices 104 within their respective coverage areas 103 via a radio downlink Data is transmitted from terminal devices 104 to the base stations 101 via a radio uplink. Wireless communications systems such as those arranged in accordance with the 3GPP defined Long Term Evolution (LTE) architecture may use an orthogonal frequency division modulation (OFDM) based interface for the radio downlink (so-called OFDMA) and a single carrier frequency division multiple access scheme (SC-FDMA) on the radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to base stations of FIG. 1. Thus, the term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Figure 2:
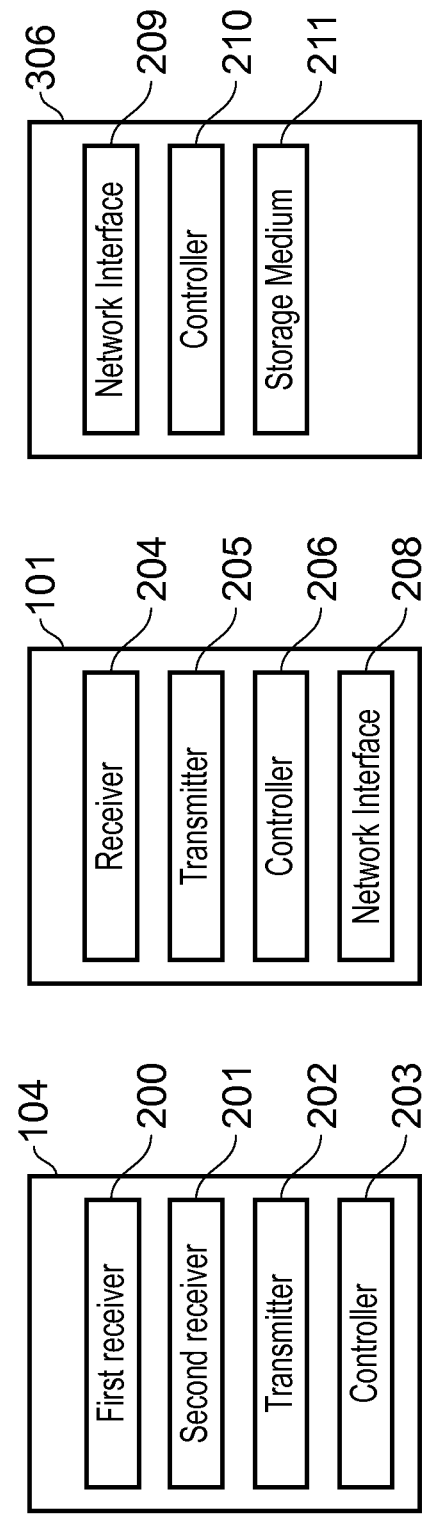
FIG. 2 schematically shows some example further aspects of a terminal device according to an example embodiment of the present disclosure.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above. FIG. 2 schematically shows some components of a UE 104, a base station 101 and a location server 306 according to an example embodiment.

The UE 104 comprises circuitry for a plurality of different position sensing technologies as schematically represented in FIG. 2 by a first positioning circuit (circuitry) 200A, second positioning circuit (circuitry) 200B, . . . , nth positioning circuit (circuitry) 200N. These respective circuits may be used by the terminal device to establish position estimates for the terminal device in accordance with different position sensing technologies. She UE further comprises, a receiver 201 and a transmitter 202 (which together function as a transceiver/transceiver circuitry for the terminal device) and a controller (processor circuitry) 203. The respective positioning circuits 200 comprises circuitry for determining a position for the terminal device (UE) in accordance with different position sensing technologies as discussed further herein. One of the positioning sensing technologies in accordance with certain embodiments of the disclosure is a global navigation satellite system (GNSS) technology, such as GPS. Thus, in this example the first positioning circuit 200A comprises a GNSS receiver. The receiver 201 is for reception of wireless signals (e.g. radio signals). The transmitter 202 is for transmission of wireless signals (e.g. radio signals). The controller 203 is configured to control the positioning circuits 200, receiver 201 and transmitter 202 and to control the UE 104 to operate in accordance with embodiments of the present disclosure. The controller 203 may comprise various sub-units for providing functionality in accordance with embodiments of the present disclosure as explained further herein. These sub-units may be implemented as discrete hardware elements or as appropriately configured functions of the controller 203. Thus the controller 203 may comprise circuitry that is suitably configured/programmed to provide the desired functionality described herein using conventional programming/configuration techniques for equipment in telecommunications systems. The positioning circuits/circuitry 200, receiver 201, transmitter 200 and controller 203 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like.

The base station (network access node) 101 comprises a transmitter 205 and a receiver 204 (which together operate as a transceiver/transceiver circuitry for the base station), a network interface 208 and a controller (processor circuitry) 206. The transmitter 205 is for transmission of wireless signals (e.g. radio signals), the receiver 204 is for reception of wireless signals (e.g. radio signals), the network interface 208 for transmission and reception of signals (e.g. to and from a location server via the core network as explained further herein) over a network such as the internet, and the controller 206 is configured to control the transmitter 205, receiver 204 and network interface 208 to control the base station 101 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may comprise circuitry suitably configured/programmed to provide the desired functionality described herein using conventional programming/configuration techniques for equipment in telecommunications systems. The transmitter 205, receiver 204, network interface 208 and controller 206 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality.

The data processing apparatus 306 comprises a network interface 209, a storage medium 211 and a controller (processor circuitry) 210. The network interface 209 is for transmission and reception of signals (e.g. to and from infrastructure equipment, such as the base station 101 via the core network, as discussed further herein) over a network such as the internet. The storage medium 211 is for storage of digital data (and may take the form of a hard disk drive, solid state drive, tape drive or the like, for example). The controller 210 is configured to control the network interface 208 and storage medium 211 and to control the data processing apparatus 306 to operate in accordance with embodiments of the present disclosure The controller 210 may comprise various sub-units for providing functionality in accordance with embodiments of the present disclosure as explained further below. These sub-units may be implemented as discrete hardware elements or as appropriately configured functions of the controller 210. The controller 210 may thus comprise circuitry suitably configured/programmed to provide the desired functionality described herein using conventional programming/configuration techniques for equipment in telecommunications systems. The network interface 209, storage medium 211 and controller 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the data processing apparatus 306 will in general comprise various other elements associated with its operating functionality.

It has been proposed for wireless telecommunications systems to include a location server to provide terminal devices with information to help them when estimating their position and to support location based services. For example, in one operating scenario for the UE 104, the first positioning circuit (GNSS receiver) 200A is configured to receive first signalling from one or more signal emitting devices located at respective spatial positions—i.e. positioning satellites, such as GPS satellites. The transmitter 202 is configured to transmit second signalling to infrastructure equipment (such as the base station 101) of the wireless telecommunications network. The receiver 201 is configured to receive third signalling from the infrastructure equipment, the third signalling being transmitted by the infrastructure equipment in response to the infrastructure equipment receiving the second signalling, the third signalling indicating the respective spatial positions of each of the one or more signal emitting devices (e.g. GPS satellites). The third signalling may be comprised within a system information block (SIB). The controller 203 is configured to determine a spatial position of the terminal device based on the received first and third signalling. In that sense, the terminal device is able to obtain positioning information using its positioning circuitry, and to request from the network information to use in conjunction with its own positioning information to help determine a position for the terminal device. The information requested from the network may be communicated to the terminal device in a system information broadcast, SIB, in an approach known as on demand SIB. One aspect of using SIB is that the terminal device may obtain the information in a radio resource connection, RRC, idle or inactive mode.

In the base station 101, the receiver 204 is configured to receive the second signalling from the terminal device/UE 104, the second signalling being transmitted by the terminal device in response to the terminal device receiving the first signalling using its GNSS receiver 200A. The controller 206 is configured, in response to the reception of the second signalling, to obtain information on the respective spatial positions of each of the one or more signal emitting devices (GNSS satellites) from the location server. The transmitter 205 is configured to transmit third signalling to the terminal device, the third signalling indicating the respective spatial positions of each of the one or more signal emitting devices and the third signalling being comprised within a system information block (SIB) transmission.

Thus in an embodiment, the controller 203 of the UE 104 is configured to determine a spatial position of the terminal device using information obtained using its positioning circuitry and associated assistance information obtained from the network, for example using an on demand SIB approach to obtain the assistance data from a location server. That is to say, in embodiments of the present technique, the base station 101 (e.g. an LTE base station (eNodeB) or NR base station (gNodeB)) may transmit assistance information for positioning (comprised within the third signalling in the above example implementation) using on-demand system information. The UE 104 can receive the assistance information in RRC idle mode or RRC inactive mode (although it may be noted note that a RRC connected mode UE may also receive the assistance information in the same way). To support on-demand system information (SI) in this way, in an embodiment, UE signalling may be transmitted in a random access procedure (e.g. in association with Msg1 or Msg3 in a Random Access Channel (RACH) procedure) for requesting on-demand SI. While the foregoing provides one example approach for a terminal device to request positioning systems information from the network, it will be appreciated in accordance with other example implementations the terminal device may obtain positioning assistance information for use in accordance with embodiments of the disclosure in other ways, i.e. without using on-demand SIB. However, on-demand to SIB approaches may be particularly suitable for helping reduce terminal device power consumption since it allows positioning assistance data to be obtained by the terminal device in idle/inactive RRC mode.

Further details on some proposals for on-demand SI approaches are provided in WO2016/130353 [3], for example. Also, further details on the use of network positioning assistance information and more general aspects of proposed LPP (location position protocol) approaches may be found, e.g., in the document "LTE Location Based Services—Technology Introduction" white paper published by Rohde and Schwarz, April 2013 [4], available at: http://www.rohde-schwarzwireless.com/documents/LTELBSWhitePaper_RohdeSchwarz.pdf.

Figure 3:
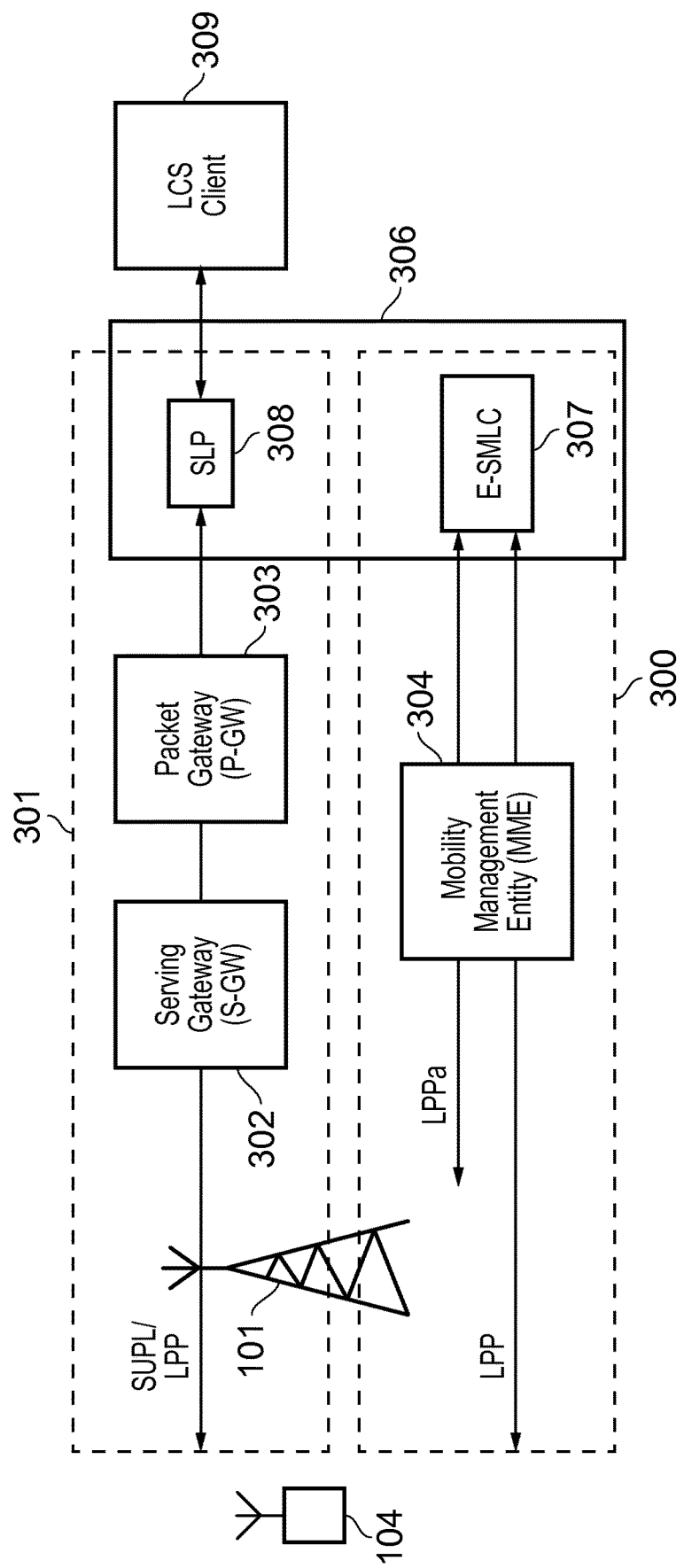
FIG. 3 schematically represents some aspects of a wireless telecommunication system in accordance with certain embodiments of the present disclosure.

FIG. 3 schematically shows some further aspects of the telecommunications system 100 configured to support operations in accordance with certain embodiments of the disclosure. As noted above, many aspects of the operation of the telecommunications system/network 100 are known and understood and are not described here in detail in the interest of brevity. Aspects of the architecture and operation of the telecommunications system 100 which are not specifically described herein may be implemented in accordance with any previously proposed techniques, for example according to current 3GPP standards, such as the 3GPP TS36 series primarily relating to LTE [1] and 3GPP TS38 series primarily relating to NR [2], and other proposals for operating wireless telecommunications systems/networks. The network access node 101 may, for convenience, sometimes be referred to herein as a base station 101, it being understood this term is used for simplicity and is not intended to imply the network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

Thus the telecommunications system 100 comprises the core network part (evolved packet core) 102 coupled to a radio network part and a location service server 306. The radio network part comprises the radio network access node (e.g. base station in an LTE implementation) 101 and the terminal device 104. It will of course be appreciated that in practice the radio network part may comprise a plurality of network access nodes serving a larger number of terminal devices across various communication cells. However, only a single network access node and one terminal device are shown in FIG. 3 in the interests of simplicity.

The terminal device 104 is arranged to communicate data to and from the network access node (transceiver station/network infrastructure equipment) 101 which in turn is communicatively coupled to the core network 102, which provides an interface to external application servers, such as the location service server 306. In the user plane (U-plane) 351, data is exchanged between the UE 104, base station 101, serving gateway 320, packet gateway 322, SLP (SUPL, Secure User plane Location, Location Platform) 330 in the location service server (LS) 306 and location service (LCS) client 360 via the SUPL and/or LPP protocols. In the control plane (C-plane) 352, data is exchanged between the base station 101, mobile management entity (MME) 318 and evolved serving mobile location centre, E-SMLC, 344 (comprised within the location service server 306) via the LPPa (LTE Positioning Protocol Annexe) protocol. Furthermore, data is exchanged between the UE 104, base station 101, MME 318 and E-SMLC 344 via the LPP protocol. More details regarding the overall architecture represented in FIG. 3 may be found, for example, in the document "LTE Location Based Services—Technology Introduction" white paper published by Rohde and Schwarz, April 2013 [4] and available at http://www.rohde-schwarzwireless.com/documents/LTELBSWhitePaper_RohdeSchwarz.pdf, for example. This architecture is also applicable to NR (in which case the base station 504 may be more frequently referred to as a gNodeB rather than an eNodeB).

It may be noted that in some implementations, the LS 306 may in effect be the same as the E-SMLC 344 because UE positioning may be implemented using a C-plane based solution (i.e. without using the U-plane). In more recent approaches, however, a U-plane solution may also be used (as enabled by SUPL 2.0 protocol, for example). In that regard, in accordance with embodiments of the present disclosure, the term "location server" may be used to include the use of both the C-plane case and U-plane case. More specifically, it will be appreciated a location server of certain embodiments may be provided in accordance with a proprietary standard/cloud service of a service provider. For example, the location server could be a SUPL 2.0 server as provided by a mobile network operator or by a service provider, by a terminal manufacture. More generally, other such location services could be used. The location server of certain embodiments may sometimes be referred to as a "SUPL server". However, this should be understood to mean an SUPL server or suitable equivalent. In general, it is noted that, in 3GPP, the LPP protocol is defined between the UE 104 and location server 306. On the other hand, the Radio Resource Control (RRC) protocol is defined between the 104 UE and base station 101.

Thus, terminal devices operating in a wireless telecommunications system may make use of the approaches discussed above to use a location server to help establish position estimates for the terminal device, for example to support a navigation service. The location server may be used to help establish a position for the terminal device based on different position sensing technologies. For example, for a position sensing technology based on a GNSS receiver at the terminal device, the location server may be configured to provide ephemeris information for the satellite constellation which is more accurate than the ephemeris information that is otherwise currently available to the terminal device. For a position sensing technology based on barometric pressure measurements at the terminal device (e.g. to determine altitude), the location server may be configured to provide atmospheric pressure information for the terminal device to use to calibrate its barometric measurements. For a position sensing technology based on radio beacon detection, for example based on proximity to a Bluetooth low-energy beacon, the location server may be configured to provide location and identification information for the beacon(s). More generally, it will be appreciated for any of the many different positioning sensing technologies that may be adopted in accordance with embodiments of the disclosure, the location server may be configured to provide relevant positioning assistance information. Furthermore, it will be recognised the specific position sensing technologies used, and the specific nature of the assistance information provided by a location server, in accordance with certain embodiments of the disclosure is not of primary significance. Rather, what is of more significance for some example approaches is the manner in which a terminal device may be configured to make use of different ones of a plurality of position sensing technologies associated with its corresponding plurality of positioning circuits.

With the increased availability of position information for communications devices, new services may be provided. Some of these services may rely on more precise positioning information than currently provided location-based services. For example, it is currently possible for a mobile device to help a user locate a shop in a particular town. For example, a user may identify a product they wish to obtain by browsing an Internet website associated with a particular shop. The user may then use a mapping application and GPS receiver in their communications device to obtain directions to the shop. Typically a GPS receiver will provide positioning information with an accuracy on the order of 10 metres or so, and works best outdoors. This means while GPS may guide a user to the shop itself, it is not generally able to provide the user with guidance to a specific location for a particular product or point of interest (POI) within the shop.

In accordance with embodiments of the disclosure, a communications device supports a plurality of different position sensing technologies and may use different ones at different times. For example, the communications device may use GPS to bring the user to a shop, but may then use a different positioning sensing technology to direct the user to a location for the product of interest within the shop, for example based on a barometric pressure sensor to determine whether the user is on the correct floor of the shop or needs to go up or down, WiFi-based position estimates to determine when the user is in the correct area of the relevant floor in the shop, a Bluetooth beacon sensor to determine when the user is within beacon detection range of a short-range beacon associated with the product of interest, and an image/camera sensor to determine when the user is within some area specified by a barcode (for example of the product of interest) by making a comparison between an image determined by the sensor and the barcode, or when the user is within some area determined by making a comparison between the sensed image and the known appearance of that area.

Accurate positioning techniques, such as hybrid positioning in which a technique for positioning changes (e.g. from GNSS to Wi-Fi based) as a communications device moves towards a target point or product of interest, also suffer from problems relating to cellular coverage. Since these products are usually (but not always) located within indoor shops, which are in turn often inside larger shopping malls, the cellular coverage (e.g. 4G/5G) is expected to become poorer as the communications device moves further inside, and towards the point or product of interest.

Accurate positioning and good coverage are essential for online to offline (O2O) e-commerce. However, as mentioned above, providing uniform indoor coverage is challenging. In short, there is not always a good correlation between a location detected with the accurate positioning techniques and good cellular coverage. Deeper inside the building (e.g. in the basement or farther from the window), the cellular coverage may not be good enough.

In conventional geo-fence applications like mobile coupons, when a customer reaches the entrance of the building, the route guidance is finished. The cellular coverage is usually good at the entrance of the building. Customers may receive shopping coupons or some kind of promotional code when near to or approaching a shop, so as to entice the customers to visit the shop. Therefore, indoor coverage is not so critical for these types of application.

On the other hand, with new applications such as O2O e-commerce, a customer may use smartphones or communications devices inside the shop, because the purpose of O2O is to promote the purchase/support the selection of a product when the customer is directly in front of a physical product. Therefore, indoor coverage on the spot is very critical for this type of application. In short it may happen that even if the accurate location for the product of interest is specified, no communication to acquire any information relating to the product of interest may be possible.

Certain triggers are considered for such applications. One of these is a trigger of communication. This comprises details relating to where and when it required for the communications device to communicate with the network, and which communications system or protocol/technology should be used at that time. Suitable trigger positions here are likely to be different to those which may trigger a change in positioning techniques, because the accurate indoor positioning methods are independent from the cellular coverage.

Hybrid Positioning and the Trigger of Pre-Emptive Communication for Data Cache

Figure 4:
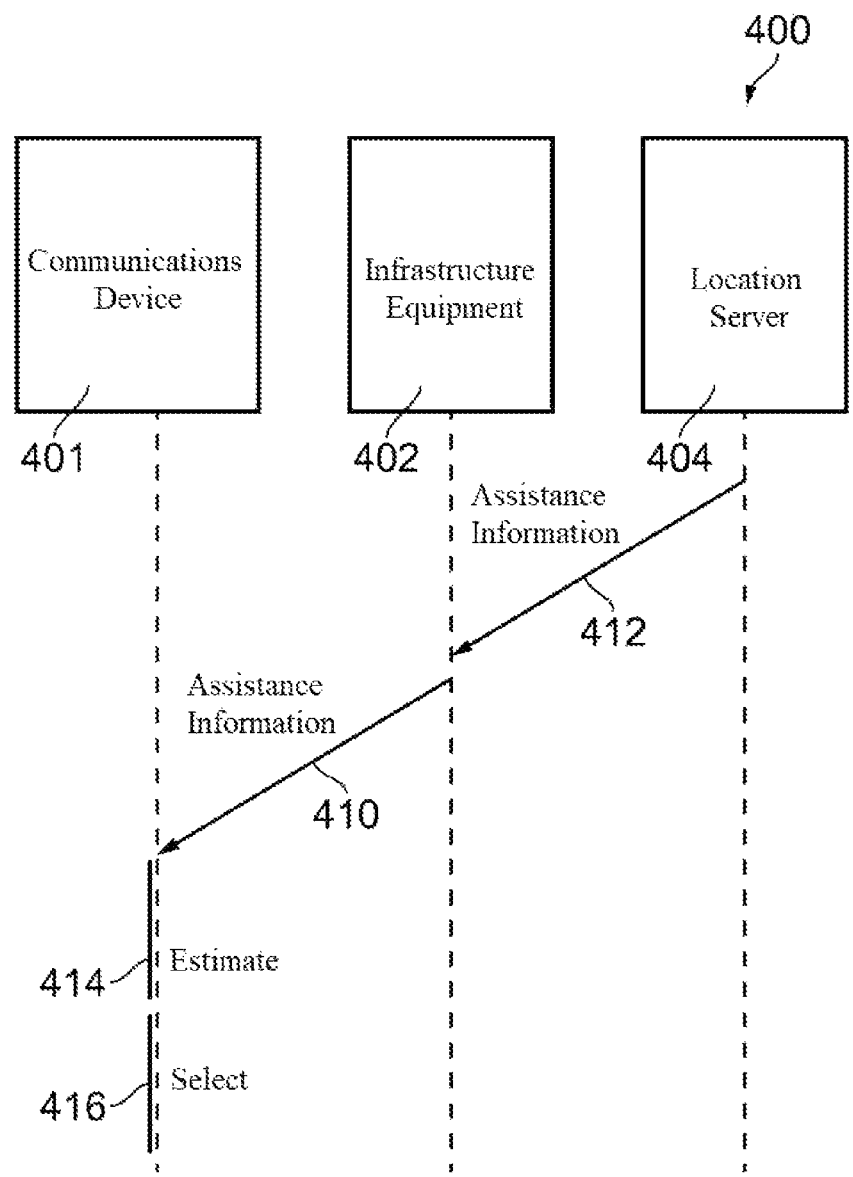
FIG. 4 shows a part schematic, part message flow diagram, illustrating a wireless communications system in accordance with embodiments of the present technique.

FIG. 4 shows a part schematic, part message flow diagram, illustrating a wireless communications system 400 in accordance with embodiments of the present technique. Embodiments of the present technique can provide a communications device 401 for use in a wireless communications system 400 comprising an infrastructure equipment 402, a location server 404 and the communications device 401. The communications device comprises transceiver circuitry and controller circuitry. The transceiver circuitry and controller circuitry are configured in combination to receive 410 assistance information comprising a communication trigger from the location server 404 via 412 the infrastructure equipment 402, to estimate 414 a current geographical location of the communications device 401, and to select 416, dependent on the current geographical location of the communications device 401 and/or on the communication trigger, one of a plurality of wireless communications technologies to be used by the communications device 401.

It would be appreciated that, in many arrangements of the above described wireless communications system 400, at least the infrastructure equipment 402 and communications device 401 each comprise a transceiver (or transceiver circuitry), and a controller (or controller circuitry). Each of the controllers may be, for example, a microprocessor, a CPU, or a dedicated chipset, etc.

Embodiments of the present technique handle a hybrid positioning method under multi-level positioning, and handle the trigger of pre-emptive communication for cached data. When a UE uses a geo-fence function in idle mode, the UE can avoid entering the connected mode, and as a result UE is able to save on power consumption. However, in some scenarios (such as when the UE is positioned deep indoors) there is a high risk of an out-of-cellular coverage near the product or point of interest (POI).

Figure 5:
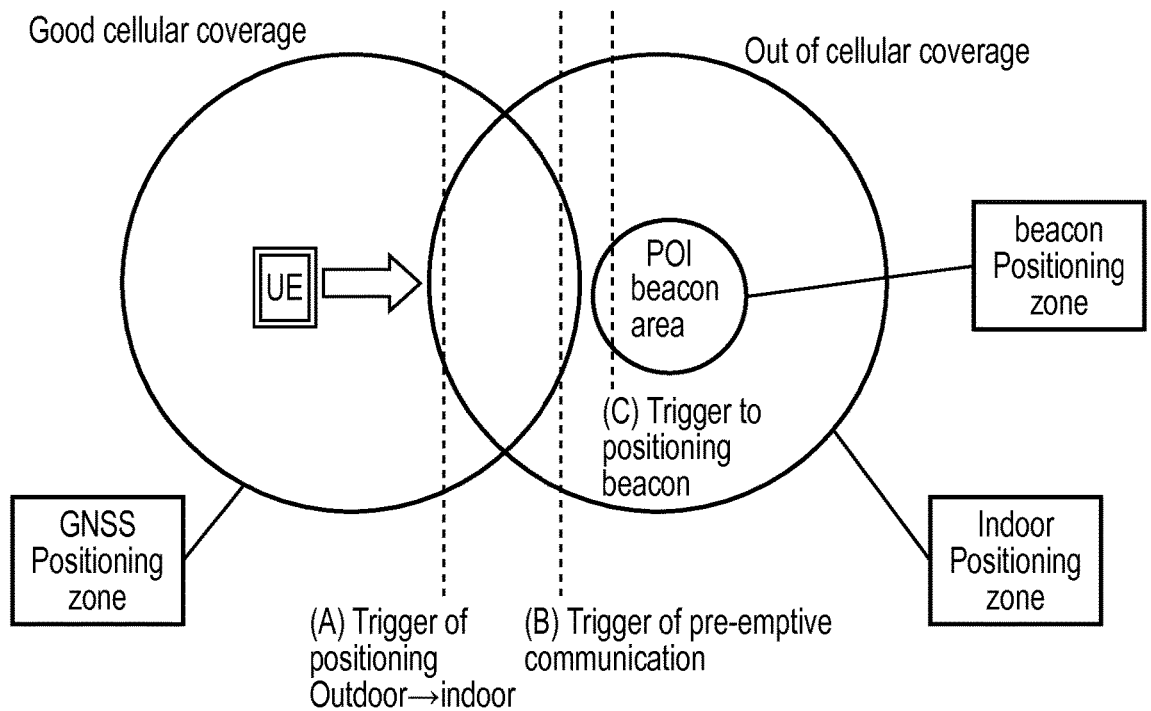
FIG. 5 shows an example of how pre-emptive communication may be triggered when a UE nears a POI, when the POI is out-of-coverage, in accordance with embodiments of the present technique.

FIG. 5 shows an example of how pre-emptive communication may be triggered when the UE nears the POI, when the POI is out-of-coverage. As stated above, POI here generally means point of interest. This is usually a target building or location in the context of GNSS, or an item/object at that location. In the example of FIG. 5, this is the target indoor position in front of a target item/object. An assumption made in FIG. 5 is that the UE is moving toward the POI under 5G coverage. However, the 5G cellular network is out-of-coverage near the POI. Here, there may be a plurality of candidate POIs until the UE would specify a more accurate location (e.g. the target POI).

A simple solution to overcome this issue is that a network can provide all the related assistance information to a UE when the UE decides upon the target POI. However, this could be a very large size and contain much redundant information. Therefore, this solution may not be particularly efficient.

Multi-level approaches are proposed in embodiments of the present disclosure. For example, the example detailed process shown in FIG. 5 is described below.

The UE is moving toward the POI (e.g. this may be one of a number of candidates in this phase) under cellular coverage (e.g. the UE is outdoor).

Trigger position (A): When UE enters the building, the GNSS signals get weaker or lost and the UE gets a less accurate positioning as a result. The UE, to combat this, switches to indoor positioning such as Pedestrian dead reckoning, or Wi-Fi positioning. Here, some POIs may be sorted from the candidates upon detection of entering the building.

The UE may receive assistance information comprising a communication trigger, which provides thresholds at which the UE knows it should switch between communications protocols/technologies (used to communicate with the base station and/or contents server), or attempt to pre-emptively retrieve information from the network or contents server before it loses coverage completely. Here, the UE may receive assistance information comprising a plurality of communication triggers or/and triggers to filter candidates down into a smaller number of candidates for the target POI. In short, there may be multiple steps within the Trigger position (A).

Trigger position (B): When passing this point, the UE may have lost cellular coverage completely. The UE can then download the relevant contents from a server at this point via cellular (if still available) or another communications protocol, e.g. Wi-Fi, otherwise. In other words, the controller circuitry is configured in combination with the transceiver circuitry to receive information relating to a target of the communications device from a contents server of the wireless communications system using the selected one of the plurality of wireless communications technologies. Taking into account popular context of O2O e-commerce, it's envisaged that the accurate location may become to a point to the product itself. In short, a network can provide the UE with any information relating to the product via the accurate location.

The UE may further receive, as part of the assistance information, an application trigger.

Trigger position (C): When the UE reaches a position very near to the POI or near to target items, the UE activates a beacon receiver (e.g. Bluetooth beacon).

When a user steps in front of the target item, UE can then show relevant information, launch an application, or play relevant contents e.g. O2O application.

In embodiments of the present technique, the target of the communications device is at least one of a building, a place of interest and an item. The information relating to the target of the communications device comprises at least one of a geographical location of the target, a URL of a website associated with the target, and an application associated with the target.

The UE may send an indication of the target of the communications to a location server (e.g. with LPP/SUPL protocol which may include the coordination or target ID). Otherwise, if the application/contents server is aware of the target of the communications device, the application/contents server may indicate this to the location server (e.g. with application programming interface (API), which may define the procedure between the location server and the application/contents server. It should be noted that the location server and application/contents server be could combine into a single consolidated server/cloud, if the same operator/service provider manages both.

In other words, the controller circuitry is configured in combination with the transceiver circuitry to transmit an indication that the communications device requires assistance information to the infrastructure equipment for transmission to the location server, or to transmit an indication of a target of the communications device to the infrastructure equipment for transmission to the location server.

The communication trigger comprises one or more predetermined geographical boundaries over which the communications device is required to cross to reach a geographical location of a target of the communications device. The indication that the communications device requires assistance information may be, for example, an on-demand system information request for the assistance information, or it may comprise an indication of the target of the communications device.

Alternatively, if a location server can estimate the UE's position, the location server may be able to estimate the UE's needs in terms of assistance information. In that case, the location server could send the assistance information without an explicit assistance information request from the UE, or receiving an indication of the target of the UE from the UE itself. If the server knows the UE's preferences and capability and is able to combine this with positioning information, the server can send the assistance information without a request.

As stated above, if the UE assistance information includes the communication trigger, the UE may execute the contents download in advance under the good coverage level and then the UE may later use the stored data when the UE is proximate to the POI. In other words, the assistance information comprises a pre-emptive trigger condition, the communications device being configured to receive the information relating to the target of the communications device from the contents server when it is detected by the communications device that the pre-emptive trigger condition is satisfied.

Figure 6:
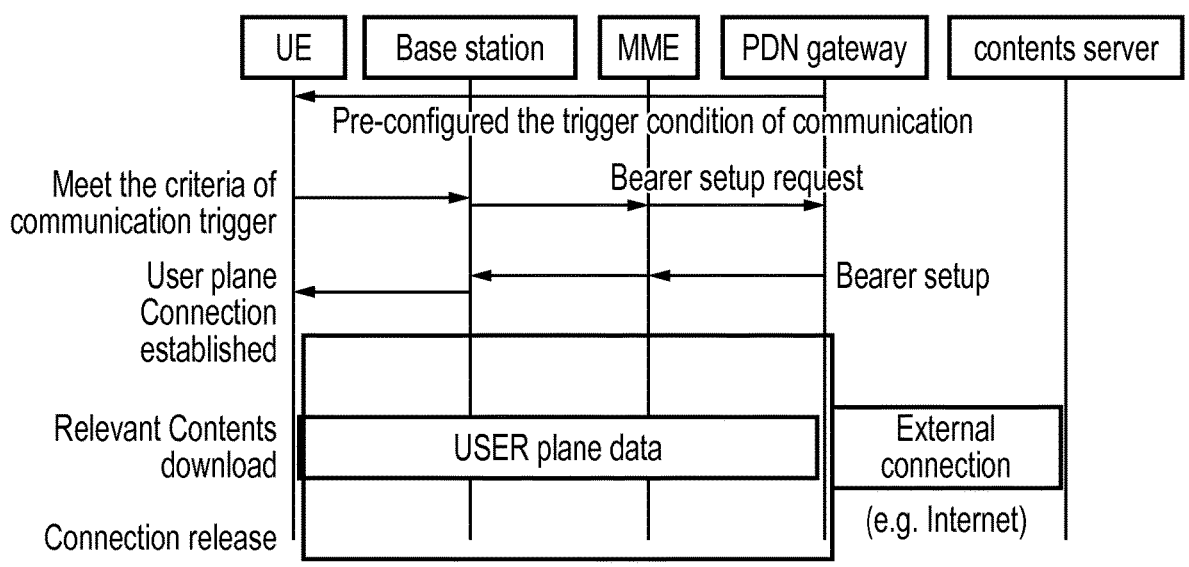
FIG. 6 shows an exemplary sequence diagram of a UE's behaviour in accordance with embodiments of the present technique.

FIG. 6 shows an exemplary sequence diagram of a UE's behaviour in relation to the communication trigger. This behaviour is described in more detail below.

The trigger condition(s) of communication is provided by the location server (via SIB or dedicated RRC signalling), or alternatively, the trigger condition(s) of communication is provided by the application/contents server.

The UE configures the received conditions of communication, for example, geo-fence for communication or cell ID and its signal strength (e.g. RSCP level).

When the UE meets the trigger conditions, the UE sends the request of bearer setup to the core network node (P-GW) via base station.

The P-GW is configured to then establish the bearer toward the UE.

The UE starts the communication (e.g. downloads contents from the external contents server/cloud).

The UE stores the downloaded data for when it is proximate to the POI.

The UE releases the bearer.

The trigger condition(s) of pre-emptive communication may need to take into account things such as the indoor coverage, type of radio communication, required QoS for application such as block error rate, latency and bit rate.

Figure 7:
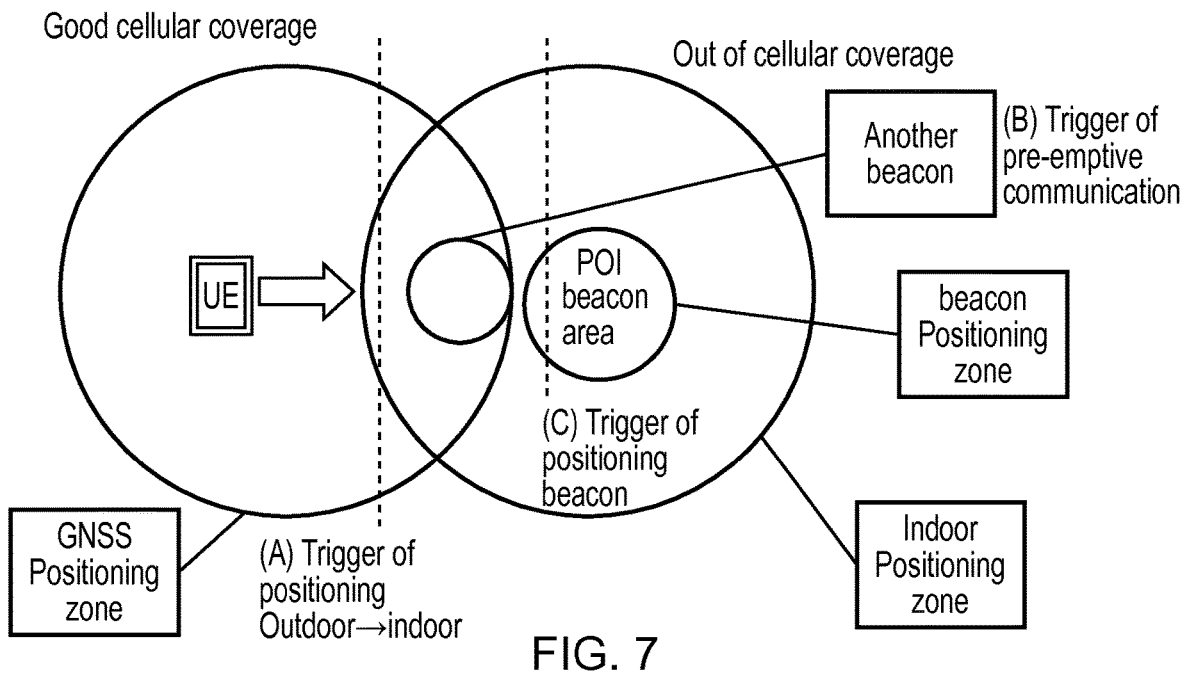
FIG. 7 shows an example of the trigger of pre-emptive communication using a beacon ID, in accordance with embodiments of the present technique.

FIG. 7 shows an example of the communication trigger condition being satisfied when the UE is approaching the target item (POI). For instance, a user may enter a museum entrance (trigger point A) which triggers the outdoor to indoor positioning. The UE may at this point request assistance information including the trigger condition of communication. The UE knows the beacon ID of the target item and that the coverage on the spot is poor. When the UE detects another beacon, which recommends that the UE pre-emptively communicate to receive the relevant information (trigger point B), the UE downloads the contents, which may be an audio guide of the target object in the museum (POI). In other words, the communication trigger comprises one or more predetermined beacon IDs which the communications device is configured to detect. Here, similarly to the example shown in FIG. 5, the trigger point B may be treated as the point where the UE may have lost cellular coverage completely when passing this point. In short, the network can notify the UE of trigger point B via the beacon ID.

Instead of a beacon ID, the UE may use the fingerprint of a cell measurement. For example, if there are more than three cells, the cell ID and signal strength and so on may be used. Then, when the UE is approaching the target object, the UE has lost the cellular New Radio (NR/5G) coverage. The UE detects the beacon ID of the POI (trigger point C), and this triggers the UE to play the contents which was stored in the previous step. In other words, the communication trigger comprises one or more predetermined radiofrequency fingerprints associated with a measurement of a cell of a wireless communications technology which has been performed by the communications device. In short, the UE can be notified of trigger point B via the finger print of the cell measurement.

A challenge faced by embodiments of the present technique is how to estimate the coverage/throughput on the spot of the target item. The preferable method is one or more combination of the current UE signal strength/coverage measurement result (such as RSRP), access point or base station database (like ANDSF) and the coverage database based on the previous result (like MDT).

Signal strength/coverage measurement
  Cellar RSRP (signal strength)/RSRQ (signal quality)/RSSI (interference) and type of cellular (W-CDMA, LTE, NR and so on)
  Wi-Fi RSSI, SSID
ANDSF (3GPP TS 24.312, 3GPP TS 23.402) parameters, Managed Object (MO). For example:
  Cell ID
  WIFI access point, SSID
  Non-3GPP access ID
MDT (3GPP TS 37.320) results
  Results of Minimization of Drive Tests (MDT) (see description in 3GPP document TS 37.320 [6], in section 5.1.1.3 entitled "Measurement reporting").
    a. For example, the measurement location and measurement results such as RSRP, RSRQ, cell ID, carrier frequency and so on.

The simple way is to define that the signal strength (or equivalent) of camp-on cell (or connected WIFI access point) is weaker than the threshold. However, this might risk that it becomes too late to communicate, especially if the UE needs high throughput. A combination of multiple Cell IDs and measurement result could provide more accurate position/condition of trigger.

When the UE detects that there are more than three cells (e.g. 5 cell IDs) and those signal strength, the UE can identify an accurate position/trigger point with the database or previous measurement recode. Even if the UE detects less than three cells, but the base station uses beamforming techniques, the UE can identify a moderately accurate position/trigger point.

Another way is to reuse the parameter of Access Network Discovery and Selection Function (ANDSF). This is the pre-defined cell/access point information by a mobile network operator (MNO). The ANDSF server provides the preferable cell/access point information to the UE in advance and the UE selects the cell/access point when the UE enters the specific one and detects the signal. However, this is mainly for the offloading of traffic or discovery of non-3GPP cell/access point (e.g. WiMAX base stations).

Figure 8:
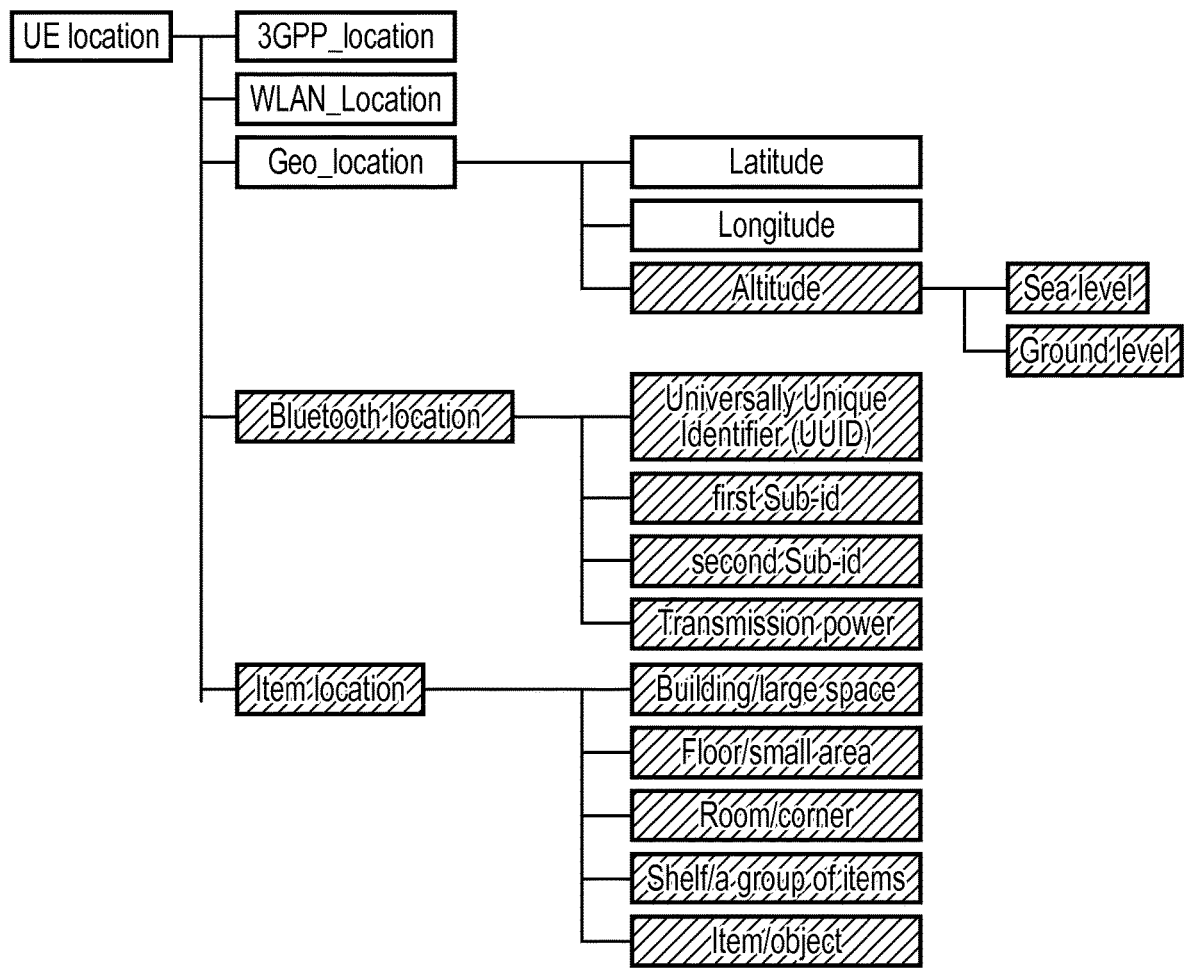
FIG. 8 shows a leaf node representation of the UE's location data structure, which is compatible with managed object (MO) in ANDSF.

In order to support this function with 3GPP, embodiments of the present technique aim to introduce a new definition of managed object (MO), Bluetooth beacon ID. FIG. 8 is extended from FIG. 4.2.4 of [5], and shows a leaf node representation of the UE's location. For example, embodiments of the present technique, to introduce the new MO definition, have to add MOs to what is shown in FIG. 8, which may include: UE-Location, BLE, beacon_prefix, universal unique identifier (UU ID), first sub ID, second sub id and transmission power. The new MOs shown in FIG. 8 which have been extended from [5] are shown shaded. Geo-location should be included in ground level or sea level. Ground level is useful for the indication of a floor of a building, while the sea level is useful for an indication of an elevation of the user or an altitude in a high position. Coordination based geo-location is useful for outdoor positioning, but different location systems for indoor or private premise/park outdoors may be well-matched with the actual layout. Thus, another system of location indication could be introduced. An example layer structure is the building ID (or a large space, such as a park), floor ID (or small space), room/corner, or an item/object.

Another way is to use the function of Minimization of Drive Tests (MDT). However, MDT is originally for outdoor coverage optimization, and therefore, it may not suitable for existing 3GPP definitions.

The existing 3GPP definition on location information in MDT can be found in a report [6], and is described in section 5.1.1.3.3.

Section 5.1.1.3.3 of [6], entitled "Reporting parameters" describes the measurement reports for neighbour cells, where the Logged MDT measurements are tagged by the UE with location data. The measurement log/report may also include RF fingerprints, and depending on the location information, the measurement report may comprise GNSS location information.

Embodiments of the present technique have to extend some functions in line with their purpose (e.g. considering indoor coverage). These include RF fingerprints being extended to Bluetooth RF and Wi-Fi RF measurement results in addition to cellular RF. Detailed location information (e.g. GNSS location information) are extended to building floor map information or the Bluetooth ID.

A process of assistance information including a communication trigger by MDT according to embodiments of the present technique may comprise:

1. [preparation phase] The mobile network operator (MNO) prepares the map (e.g. rooms/floors inside building for indoor map);
2. The location server (or MDT server or any server) collects the result of MDT including the indoor positioning information like beacon ID;
3. The location server sorts out the coverage, such as cellular/Wi-Fi signal strength and indoor building information and access point position;
4. The location server generates a coverage map/throughput map with relevant information such as LTE/5G cell ID, Wi-Fi access point information and Bluetooth beacon information and so on.
5. The location server defines the geo-fence/trigger point for the communication trigger
6. [delivery] The location server provides the assistance information to UE.

In other words, the location server is configured to receive an indication that the communications device requires assistance information from the communications device via the infrastructure equipment, to generate, in response to the indication, assistance information dependent on information collected by the location server, and to transmit the generated assistance information to the infrastructure equipment for transmission to the communications device, the assistance information being for use by the communications device to select, dependent on a current geographical location of the communications device and on the communication trigger, one of a plurality of wireless communications technologies to be used by the communications device for communication with the contents server.

The information collected by the location server may comprise at least one of a coverage measurement performed using a Minimization of Drive Tests, MDT, function, information relating to one or more of a plurality of infrastructure equipment within the wireless communications system, and position information associated with a target of the communications device, the target of the communications device being at least one of a building, a place of interest and an item.

The location server is configured to generate the assistance information based on, for example, the MDT function or an ANDSF function, which may be reused if new MOs are added.

The generated assistance information may comprise, for example, an indication of a pre-emptive trigger condition or an indication of the availability of one or more of a plurality of wireless communications technologies to be used by the communications device for communication with the contents server.

Table I shows a proposed more compact assistance information which may be used in embodiments of the present technique. Instead of using the location like coordination, beacon IDs are used. For example, Beacon ID may have three tier structure, where the tiers are large (e.g. a building ID), middle (a floor or room ID) and small (an object ID). IDs are usually an integer number, though this may not always be the case.

TABLE I

An example of assistance information (Bluetooth beacon ID and cellular communication availability)

| Bluetooth beacon IDs | | | Communication availability | |
|---|---|---|---|---|
| | | | NR | LTE |
| large | middle | small | communication | communication |
| 1 | 1 | ALL | available | available |
| 1 | 2 | 1 | available | available |
| 1 | 2 | 2 | available | available |
| 1 | 2 | 3 | available | available |
| 1 | 2 | 4 | unavailable | available |
| 1 | 3 | ALL | unavailable | available |
| 2 | ALL | ALL | unavailable | available |

When the UE reaches the entrance of a building, the UE may receive the whole table or part of the information in the table. For example, the UE receives the information in Table I, and the target is on the first floor (middle 1). Here, the UE knows that both NR and LTE are available. In that case, the UE doesn't have to perform the pre-emptive communication. However, if the target is on the second floor (middle 2) and the final target is object #4 (small 4), NR is unavailable on the spot of the target item. The UE starts the pre-emptive communication on the second floor before reaching object #4 or within the first floor.

Figure 9:
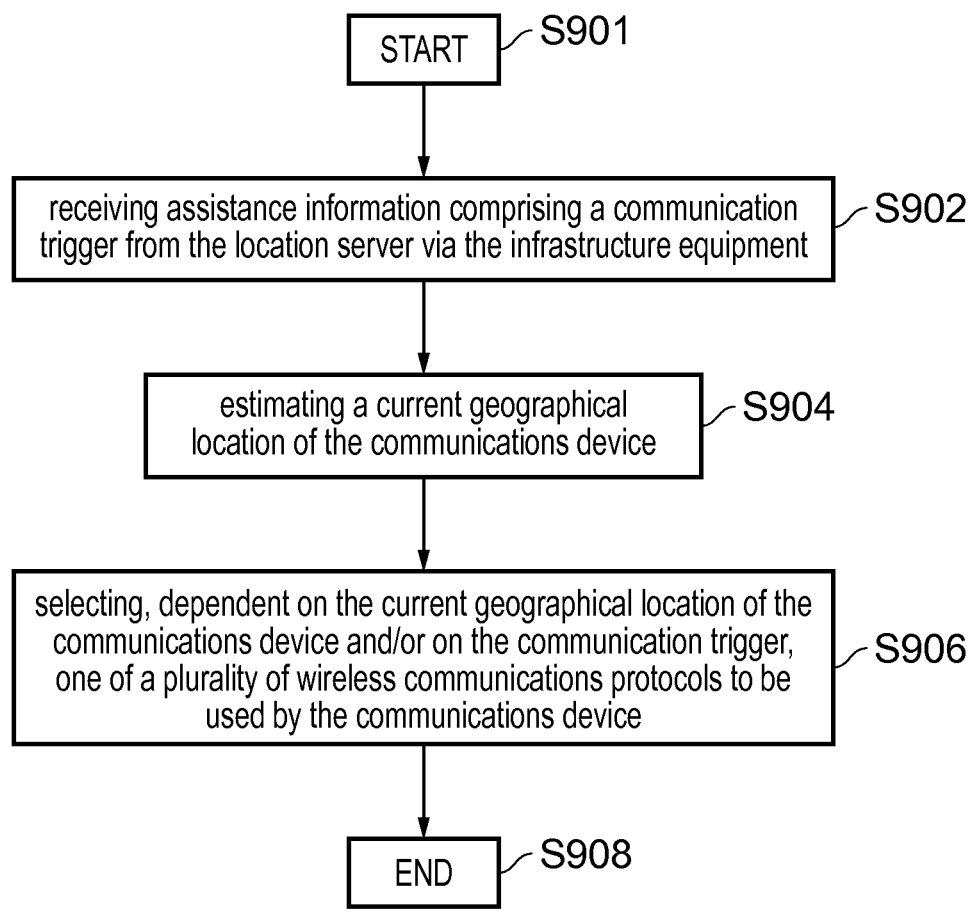
FIG. 9 shows a flow diagram illustrating a process of communications in a wireless communications system according to embodiments of the present technique.

FIG. 9 shows a flow diagram illustrating a process of communications in a communications system in accordance with embodiments of the present technique. The process is a method of operating a communications device. The process starts in step S901. The method comprises in step S902, receiving assistance information comprising a communication trigger from the location server via the infrastructure equipment. In step S904, the process comprises estimating a current geographical location of the communications device. In step S906, the method comprises selecting, dependent on the current geographical location of the communications device and/or on the communication trigger, one of a plurality of wireless communications technologies to be used by the communications device. The process ends in step S908.

Embodiments of the present technique allow for users of communications devices, who may be customers in a shop, to retrieve relevant information or services when indoors, such as by a target item in the shop, even when indoor cellular coverage on the spot is poor. This provides benefits too to the shop owners, who may be advantaged by such techniques increasing sales or attraction of customers to their shops, and to mobile network operators, who are able to provide good user experiences without a requirement for increased investment in indoor coverage improvement whilst being able to increase revenue from the new application/communication/location services using a precise positioning system.

Those skilled in the art would appreciate that such infrastructure equipment, location servers and/or communications devices as herein defined may be further defined in accordance with the various arrangements and embodiments discussed in the preceding paragraphs. It would be further appreciated by those skilled in the art that such infrastructure equipment and communications devices, as well as location servers, as herein defined and described may form part of communications systems other than those defined by the present invention.

The following numbered paragraphs provide further example aspects and features of the present technique:

Paragraph 1. A communications device for use in a wireless communications system comprising an infrastructure equipment, a location server and the communications device, the communications device comprising transceiver circuitry and controller circuitry, the transceiver circuitry and controller circuitry being configured in combination
  to receive assistance information comprising a communication trigger from the location server via the infrastructure equipment,
  to estimate a current geographical location of the communications device, and
  to select, dependent on the current geographical location of the communications device and/or on the communication trigger, one of a plurality of wireless communications technologies to be used by the communications device.

Paragraph 2. A communications device according to Paragraph 1, wherein the controller circuitry is configured in combination with the transceiver circuitry
  to transmit an indication that the communications device requires assistance information to the infrastructure equipment for transmission to the location server, or
  to transmit an indication of a target of the communications device to the infrastructure equipment for transmission to the location server Paragraph 3. A communications device according to Paragraph for Paragraph 2, wherein the controller circuitry is configured in combination with the transceiver circuitry
  to receive information relating to a target of the communications device from a contents server of the wireless communications system using the selected one of the plurality of wireless communications technologies.

Paragraph 4. A communications device according to Paragraph 3, wherein the assistance information comprises a pre-emptive trigger condition, the communications device being configured to receive the information relating to the target of the communications device from the contents server when it is detected by the communications device that the pre-emptive trigger condition is satisfied.

Paragraph 5. A communications device according to Paragraph 2, wherein the target of the communications device is at least one of a building, a place of interest and an item.

Paragraph 6. A communications device according to any of Paragraphs 3 to 5, wherein the information relating to the target of the communications device comprises at least one of a geographical location of the target, a URL of a website associated with the target, and an application associated with the target.

Paragraph 7. A communications device according to any of Paragraphs 1 to 6, wherein the communication trigger comprises one or more predetermined geographical boundaries over which the communications device is required to cross to reach a geographical location of a target of the communications device.

Paragraph 8. A communications device according to any of Paragraphs 1 to 7, wherein the communication trigger comprises one or more predetermined geographical areas within which the communications device is expected to have one or both of a coverage level of a wireless communications technology above a predetermined coverage threshold or a throughput above a predetermined throughput threshold.

Paragraph 9. A communications device according to any of Paragraphs 1 to 8, wherein the communication trigger comprises one or more predetermined radiofrequency fingerprints associated with a measurement of a cell of a wireless communications technology which has been performed by the communications device.

Paragraph 10. A communications device according to any of Paragraphs 1 to 9, wherein the communication trigger comprises one or more predetermined beacon IDs which the communications device is configured to detect.

Paragraph 11. A communications device according to any of Paragraphs 2 to 10, wherein the indication that the communications device requires the assistance information comprises an on-demand system information request for the assistance information.

Paragraph 12. A method of operating a communications device for use in a wireless communications system comprising an infrastructure equipment, a location server and the communications device, the method comprising
receiving assistance information comprising a communication trigger from the location server via the infrastructure equipment,
estimating a current geographical location of the communications device, and
selecting, dependent on the current geographical location of the communications device and/or on the communication trigger, one of a plurality of wireless communications technologies to be used by the communications device.

Paragraph 13. Circuitry for a communications device for use in a wireless communications system comprising an infrastructure equipment, a location server and the communications device, the communications device comprising transceiver circuitry and controller circuitry, the transceiver circuitry and controller circuitry being configured in combination
to receive assistance information comprising a communication trigger from the location server via the infrastructure equipment,
to estimate a current geographical location of the communications device, and
to select, dependent on the current geographical location of the communications device and on the communication trigger, one of a plurality of wireless communications technologies to be used by the communications device.

Paragraph 14. An infrastructure equipment for use in a wireless communications system comprising the infrastructure equipment, a location server and a communications device, the infrastructure equipment comprising transceiver circuitry and controller circuitry, the transceiver circuitry and controller circuitry being configured in combination
to receive assistance information comprising a communication trigger from the location server,
to transmit the assistance information comprising the communication trigger to the communications device, the assistance information being for use by the communications device to select, dependent on a current geographical location of the communications device and/or on the communication trigger, one of a plurality of wireless communications technologies to be used by the communications device.

Paragraph 15. An infrastructure equipment according to Paragraph 14, wherein the controller circuitry is configured in combination with the receiver circuitry
to determine whether the assistance information relates to a requirement of the communications trigger or to a requirement of a positioning trigger relating to one of a plurality of positioning techniques to be used by the communications device, an indication that the communications device requires the assistance information having been received from the communications device via an on-demand system information request.

Paragraph 16. A method of operating an infrastructure equipment for use in a wireless communications system comprising the infrastructure equipment, a location server and a communications device, the method comprising
receiving assistance information comprising a communication trigger from the location server,
transmitting the assistance information comprising the communication trigger to the communications device, the assistance information being for use by the communications device to select, dependent on a current geographical location of the communications device and/or on the communication trigger, one of a plurality of wireless communications technologies to be used by the communications device.

Paragraph 17. Circuitry for an infrastructure equipment for use in a wireless communications system comprising the infrastructure equipment, a location server and a communications device, the infrastructure equipment comprising transceiver circuitry and controller circuitry, the transceiver circuitry and controller circuitry being configured in combination
to receive assistance information comprising a communication trigger from the location server,
to transmit the assistance information comprising the communication trigger to the communications device, the assistance information being for use by the communications device to select, dependent on a current geographical location of the communications device and/or on the communication trigger, one of a plurality of wireless communications technologies to be used by the communications device.

Paragraph 18. A location server for use in a wireless communications system comprising an infrastructure equipment, the location server and a communications device, the location server being configured
to generate assistance information dependent on information collected by the location server, and
to transmit the generated assistance information to the infrastructure equipment for transmission to the communications device, the assistance information being for use by the communications device to select, dependent on a current geographical location of the communications device and/or on the communication trigger, one of a plurality of wireless communications technologies to be used by the communications device.

Paragraph 19. A location server according to Paragraph 18, wherein the information collected by the location server comprises at least one of a coverage measurement performed using a Minimization of Drive Tests, MDT, function, information relating to one or more of a plurality of infrastructure equipment within the wireless communications system, and position information associated with a target of the communications device, the target of the communications device being at least one of a building, a place of interest and an item.

Paragraph 20. A location server according to Paragraph 18 or Paragraph 19, wherein the location server is configured to generate the assistance information based on an MDT function.

Paragraph 21. A location server according to any of Paragraphs 18 to 20, wherein the location server is configured to generate the assistance information based on an Access Network Discovery and Selection Function, ANDSF.

Paragraph 22. A location server according to any of Paragraphs 18 to 21, wherein the generated assistance information transmitted by the location server comprises an indication of a pre-emptive trigger condition.

Paragraph 23. A location server according to any of Paragraphs 18 to 22, wherein the generated assistance information transmitted by the location server comprises an indication of the availability of one or more of a plurality of wireless communications technologies to be used by the communications device for communication with the contents server.

Paragraph 24. A method of operating a location server for use in a wireless communications system comprising an infrastructure equipment, the location server and a communications device, the method comprising generating assistance information dependent on information collected by the location server, and transmitting the generated assistance information to the infrastructure equipment for transmission to the communications device, the assistance information being for use by the communications device to select, dependent on a current geographical location of the communications device and/or on the communication trigger, one of a plurality of wireless communications technologies to be used by the communications device.

Paragraph 25. Circuitry for a location server for use in a wireless communications system comprising an infrastructure equipment, the location server, a contents server and a communications device, the location server being configured to generate assistance information dependent on information collected by the location server, and to transmit the generated assistance information to the infrastructure equipment for transmission to the communications device, the assistance information being for use by the communications device to select, dependent on a current geographical location of the communications device and/or on the communication trigger, one of a plurality of wireless communications technologies to be used by the communications device.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] http://www.3gpp.org/DynaReport/36-series.htm.
[2] http://www.3gpp.org/DynaReport/38-series.htm.
[3] WO2016/130353.
[4] "LTE Location Based Services—Technology Introduction", Thorpe, Kottkamp, Rossler, Rohde and Schwarz, April 2013.
[5] 3GPP TS 24.312 V13.4.0 (September 2016).
[6] 3GPP TS 37.320 V13.1.0 (March 2016).

What is claimed is:

1. A communications device for use in a wireless communications system comprising an infrastructure equipment, a location server and the communications device, the communications device comprising:

transceiver circuitry; and controller circuitry configured in combination with the transceiver circuitry to:

request, using a first wireless communications technology and in a case that the communications device determines that a first communication trigger is satisfied, assistance information from the location server via the infrastructure equipment, wherein the first communication trigger is satisfied when the communications device has moved from outside of a building to a position inside the building;

receive the assistance information from the location server via the infrastructure equipment and in response to the request, wherein the assistance information includes a second communication trigger which is triggered with movement to a position within a first area inside the building, the first area including a point of interest (POI);

pre-emptively download and locally store in the communications device, in a case that the communications device determines the second communication trigger is satisfied, guide content relating to the POI;

receive, in a case that the communications device has moved to a position within a second area and closer to the POI, a beacon identifier via a second wireless communications technology from a device in a proximity of the POI in the second area without communication via the infrastructure equipment, wherein the second area is within the first area and the POI is in the second area;

estimate, based on the beacon identifier received from the device, a position of the communications device with respect to the POI;

determine whether a third communication trigger has been satisfied based on the position;

select, in a case that the communications device determines that the third communication trigger has been satisfied, a wireless communications technology to be used for communication while the communications device is in the proximity of the POI; and output, in the case that the communications device determines that the third communication trigger has been satisfied, the guide content locally stored in the communications device.

2. The communications device according to claim 1, wherein to request the assistance information, the controller circuitry is further configured in combination with the transceiver circuitry to
transmit an indication that the communications device requires the assistance information to the infrastructure equipment for transmission to the location server, or
transmit an indication of a target of the communications device to the infrastructure equipment for transmission to the location server.

3. The communications device according to claim 2, wherein the target of the communications device is at least one of the building, the POI and an item.

4. The communications device according to claim 2, wherein the indication that the communications device requires the assistance information comprises an on-demand system information request for the assistance information.

5. The communications device according to claim 1, wherein the controller circuitry is further configured in combination with the transceiver circuitry to receive information relating to a target of the communications device from a contents server of the wireless communications system using the selected one of the plurality of wireless communications technologies.

6. The communications device according to claim 5, wherein the assistance information comprises a pre-emptive trigger condition, the communications device being configured to receive the information relating to the target of the communications device from the contents server when the communications device detects that the pre-emptive trigger condition is satisfied.

7. The communications device according to claim 5, wherein the information relating to the target of the communications device comprises at least one of a geographical location of the target, a URL of a website associated with the target, and an application associated with the target.

8. The communications device according to claim 1, wherein the first communication trigger comprises one or more predetermined geographical boundaries over which the communications device is required to cross to reach a geographical location of a target of the communications device.

9. The communications device according to claim 1, wherein the first communication trigger comprises one or more predetermined geographical areas within which the communications device is expected to have one or both of a coverage level of a wireless communications technology above a predetermined coverage threshold or a throughput above a predetermined throughput threshold.

10. The communications device according to claim 1, wherein the first communication trigger comprises one or more predetermined radiofrequency fingerprints associated with a measurement of a cell of a wireless communications technology which has been performed by the communications device.

11. The communications device according to claim 1, wherein the first communication trigger comprises one or more predetermined beacon identifiers which the communications device is configured to detect.

12. The communications device according to claim 1, wherein the controller circuitry is configured to estimate the position without referring to the assistance information.

13. A communications method for a communications device used in a wireless communications system comprising an infrastructure equipment, a location server and the communications device, the communications method comprising:
requesting, using a first wireless communications technology and in a case that the communications device determines that a first communication trigger is satisfied, assistance information from the location server via the infrastructure equipment, wherein the first communication trigger is satisfied when the communications device has moved from outside of a building to a position inside the building;
receiving the assistance information from the location server via the infrastructure equipment and in response to the request, wherein the assistance information includes a second communication trigger which is triggered with movement to a position within a first area inside the building, the first area including a point of interest (POI);
pre-emptively downloading and locally storing in the communications device, in a case that the communications device determines the second communication trigger is satisfied, guide content relating to the POI;
receiving, in a case that the communications device has moved to a position within a second area and closer to the POI, a beacon identifier via a second wireless communications technology from a device in a proximity of the POI in the second area without communication via the infrastructure equipment, wherein the second area is within the first area and the POI is in the second area;
estimating, based on the beacon identifier received from the device, a position of the communications device with respect to the POI;
determining whether a third communication trigger has been satisfied based on the position;
selecting, in a case that the communications device determines that the third communication trigger has been satisfied, a wireless communications technology to be used for communication while the communications device is in the proximity of the POI; and
outputting, in the case that the communications device determines that the third communication trigger has been satisfied, the guide content locally stored in the communications device.

14. The communications method according to claim 13, wherein the requesting the assistance information includes:
transmitting an indication that the communications device requires assistance information to the infrastructure equipment for transmission to the location server; or
transmitting an indication of a target of the communications device to the infrastructure equipment for transmission to the location server.

15. The communications method according to claim 14, wherein the target of the communications device is at least one of the building, the POI and an item.

16. The communications method according to claim 13, further comprising receiving information relating to a target of the communications device from a contents server of the wireless communications system using the selected one of the plurality of wireless communications technologies.

17. The communications method according to claim 16, wherein the assistance information comprises a pre-emptive trigger condition, the communications device being configured to receive the information relating to the target of the communications device from the contents server when the communications device detects that the pre-emptive trigger condition is satisfied.

18. The communications method according to claim 16, wherein the information relating to the target of the communications device comprises at least one of a geographical location of the target, a URL of a website associated with the target, and an application associated with the target.

* * * * *